Patented Dec. 29, 1953

2,664,401

UNITED STATES PATENT OFFICE 2,664,401

ALKALINE EARTH PHOSPHATE PHOSPHORS OF THE APATITE TYPE

Alfred Hamilton McKeag and Peter Whitten Ranby, North Wembley, England, assignors to General Electric Company, a corporation of New York No Drawing. Application April 1, 1949, Serial No. 85,037

7 Claims. (Cl. 252—301.4)

This invention relates to luminescent materials, one of its objects being to provide a method of manufacturing luminescent materials of novel composition which are suitable for use in fluorescent lamps or cathode ray tube screens or X-ray screens, or for two or more of these uses. The invention also relates to combinations of such luminescent materials with electrical means for exciting them to luminescence, for example electric discharge lamps and cathode ray tubes.

In general, luminescent materials of different composition differ also in the colour or efficiency of their luminescence or in the radiations by which they are excited to luminescence, or in two or more of these properties. It may be observed, however, that a material of a new composition might be useful even if it resembled known materials very closely in all these properties.

The present invention is based upon the discovery that certain alkaline earth phosphates which do not exhibit luminescence can be converted into luminescent materials by heating with a suitable activator in an atmosphere consisting of or containing steam, and that other materials which comprise alkaline earth phosphates and one or more activators and which exhibit luminescence have the colour of their luminescence modified by heating in a similar atmosphere.

According to the present invention, therefore, a method of manufacturing a novel crystalline luminescent material comprises the step of heating to a suitable temperature, in an atmosphere consisting of or containing steam, a material or mixture containing one or more of the metals calcium, strontium and barium together with phosphorus, oxygen and a suitable activator, said material or mixture either having the apatite type of crystal structure or containing the said metal or metals, phosphorus and oxygen in proportions such as to produce, during the said heating, a compound having such a crystal structure, and which material or mixture either is not a luminescent material or is a luminescent material with different luminescent properties from those of the product of the heating.

It has not been possible as yet to ascertain with certainty the precise composition of the luminescent materials obtained by the method of the present invention, but it is believed that at least some of the materials produced consist of or comprise activated hydroxy-phosphates or oxy-phosphates of the alkaline earth metals. We have found by X-ray analysis that luminescent materials produced by the method in accordance with the invention possess the crystal structure of the type characteristic of apatite and a precise determination of the lattice parameters is under investigation. One material which we have prepared and have been able to examine in more detail consists of a matrix containing the elements calcium, phosphorus and oxygen and an activator comprising at least one of the elements copper, antimony, tin and thallium, with or without manganese, which matrix is free from halogen and has the apatite type of crystal structure, the lattice parameters being $a_0 = 9.38 \pm 0.01$ Å. and $c_0 = 6.85 \pm 0.01$ Å.

The above mentioned lattice parameters are the constants by which the unit cell of the crystal lattice is defined. Thus, the unit cell of the apatite crystal structure is essentially a regular hexagon, of which the $c_0$ parameter is the length of the axis perpendicular to the base, and the $a_0$ parameter is the length of the line joining the centre of the base plane to a vertex of the base.

It is believed that the matrix of the above-defined material consists of either calcium hydroxy-phosphate, $3Ca_3(PO_4)_2 Ca(OH)_2$ or calcium oxy-phosphate, $3Ca_3(PO_4)_2 CaO$.

The luminescent materials produced by the method of the invention may be excited to luminescence by ultraviolet radiation, particularly that of wavelength 2537 Å., or by cathode rays or by X-rays, or by two or more of these agents, the colour and intensity of the luminescence varying somewhat with different exciting agents.

The starting materials employed for the method of the invention may comprise one or more phosphates of suitable composition (such as ortho-phosphates) of one or more of the alkaline earth metals, or may consist of mixtures adapted to produce such phosphates by a chemical reaction promoted by heating or other suitable treatment, the mixtures preferably being such that the other products of the reaction are eliminated during the treatment. For example a mixture consisting of a salt, such as a carbonate, of an alkaline earth metal and a suitable phosphate, such as ammonium phosphate, in the required proportions, may conveniently be used. Such a mixture is first heated in air to produce the alkaline earth metal phosphate by double decomposition and to drive off the volatile products of the reaction, and then the product, in admixture with a suitable activator, is heated in an atmosphere consisting of or containing steam in accordance with the invention. The activator may be introduced in the form of a suitable compound, such as an oxide or a salt, of the activating metal, and such compound either may be added to the original mixture or may be mixed with the product of the initial heating of said mixture.

The preferred activators for use in the luminescent materials produced according to the invention are copper, antimony, tin and thallium. Copper has been found to be particularly suitable as an activator in materials for use in the production of cathode ray tube screens. The proportions of activators present in the material are not critical, but the optimum proportions are different for different activators; the proportions we have found most suitable are, approximately, 0.1% for copper, 1% to 3% for antimony, 1% for thallium and 2% to 10% for tin, by weight of the luminescent material. Manganese may be used in combination with any of the activator metals, and is also preferably introduced in the form of a compound, a phosphate being suitable. The amount of manganese used may vary over a wide range, suitable proportions being, for example, from 1% to 5% by weight of the material. The effect of the addition of manganese is to modify the colour of the luminescence, although manganese alone does not appear to produce luminescence in these materials under excitation by ultraviolet radiation of wavelength 2537 Å. For example a combination of thallium and manganese has been found particularly useful, since the addition of manganese to material activated by thallium changes the colour of the luminescence from deep blue to pink. Similarly the addition of manganese to copper-activated materials shifts the colour of the luminescence in the direction of longer wavelengths.

In the case of materials containing antimony as activator, however, the addition of manganese does not appear to shift the colour of the luminescence to longer wavelengths. In this respect, therefore, the effect of activators on the materials prepared by the method of the present invention is different from that obtained with the known halophosphate materials, as described for example in British patent specification No. 578,192. This distinction between the two classes of materials may be clearly shown by treating a halophosphate material by the method according to the present invention. For example when the calcium fluorophosphate activated by antimony and manganese, prepared as described in specification No. 578,192 and showing a white-pink fluorescence, is heated at a temperature between 900° C. and 1150° C. in an atomsphere of steam the colour of the fluorescence changes in the direction of shorter wavelengths, approaching nearer to the blue end of the spectrum the longer the time for which the heating is carried out, and eventually being converted into green-blue.

It is known that some metals other than the alkaline earth metals, for example cadmium or magnesium, may also form phosphates having the apatite type of crystal lattice structure, so that it appears to be possible that some of these phosphates may be capable of entering into solid solution with the materials prepared in accordance with the invention, especially in very small proportions, without altering appreciably either the crystal structure or the luminescent properties of the material, acting in effect as a mere diluent. We known of no advantage accruing from the presence of any such addition in a material prepared in acordance with this invention, but in view of this possibility we desire it to be understood that the use or presence of such a merely diluting addition is not excluded from the scope of the appended claims.

The atmosphere employed in the method of the invention may consist of steam alone or of steam in admixture with one or more gases which do not exert any deleterious action on the material or mixture being heated therein. Thus, for example, mixtures of steam with air, nitrogen or hydrogen may be used; the use of air is, of course, only suitable in cases where the presence of an oxidising atmosphere is not harmful, while in some cases, for example, when tin is used as the activator, reducing conditions during the heating are desirable or necessary so that the atmosphere employed consists of a mixture of steam and hydrogen.

The heating in the steam-containing atmosphere may be carried out at temperatures between 900° C. and 1200° C., the preferred temperature range being from 1100° C. to 1200° C. The time required to complete the treatment varies according to the amount of material being treated, and depends upon the temperature employed, being generally of the order of half an hour to an hour at 1150° C.

The materials employed in the preparation of luminescent materials by the method according to the invention should all be of the highest purity obtainable.

Some specific examples of methods, in accordance with the invention, of manufacturing luminescent materials will now be given. In each example the stated colour of luminescence is that of the fluorescence produced under excitation by ultraviolet radiation of wavelength 2537 Å.

*Example I*

10 gms. of calcium carbonate, $CaCO_3$, 7.9 gms. of diammonium hydrogen phosphate, $(NH_4)_2HPO_4$ and 0.04 gm. of copper sulphate, $CuSO_4 \cdot 5H_2O$, 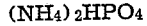 are ground together and the mixture is heated in an open crucible at 1000° C. for half an hour. The product of this heating is ground and is then heated in an atmosphere of steam at a temperature of 1150° C. for half an hour.

The product is allowed to cool in steam and, when cool, exhibits a pale blue fluorescence.

*Example II*

The method of Example I is modified by using 0.4 gm. of antimony trioxide, $Sb_2O_3$, in place of the copper sulphate. The product, when cool, shows a pale green-blue fluorescence.

*Example III*

The method of Example I is modified by using 1 gm. of stannous oxide, SnO, in place of the copper sulphate and by mixing hydrogen with the steam to produce a reducing atmosphere during the heating. The product, when cool, shows a deepu blue fluorescence.

*Example IV*

The method of Example I is modified by using 0.2 gm. of thallous nitrate, $TlNO_3$, in place of the copper sulphate. The product, when cool, shows a deep blue fluorescence.

*Example V*

The method of Example IV is modified by adding 0.3 gm. manganese phosphate to the initial mixture. The product, when cool, shows a pink fluorescence.

Example VI

The blue-fluorescing calcium fluorophosphate, $3Ca_3(PO_4)_2 \cdot 1CaF_2$, activated with antimony, prepared in the manner described in patent specification No. 578,192, is heated in steam at 1150° C. for half an hour. The product shows a pale green-blue fluorescence.

Example VIII

The method of Example VI is modified in that the starting material consists of calcium fluorophosphate of the same composition but activated with antimony and manganese, its original fluorescence being white-pink in colour. After the heat treatment in steam the material shows a pale green-blue fluorescence.

Example VIII 10 gms. of strontium carbonate, $SrCO_3$, 5.4 gms. of diammonium hydrogen phosphate, $$(NH_4)_2HPO_4$$

0.35 gm. of stannous oxide, SnO, and 0.1 gm. of manganese phosphate are ground together and the mixture is heated in air at 1100° C. for half an hour. The resulting material is ground and is then heated in steam at 1150° C. for 15 minutes and allowed to cool in steam. The product, when cool, shows a pink fluorescence.

The product obtained by each of the methods described in the above examples may be ground to a fine powder in the usual way and is then ready for application to a discharge lamp, cathode ray tube screen or X-ray screen by any suitable method.

It has been found that when a luminescent material prepared according to any of the examples given is heated in air to a temperature of about 1000° C. it begins to decompose, possibly with the loss of water, and in most cases with loss of its luminescent properties. However, by reheating in the presence of steam at 1150° C. the original luminescence can frequently be restored.

We claim:

1. A luminescent composition having a matrix of apatite type crystalline structure of the group consisting of $3M_3(PO_4)_2 \cdot M(OH)_2$ and $$3M_3(PO_4)_2 \cdot MO$$

wherein M is an alkaline earth metal, and an activator of the group consisting of one of the metals copper, antimony, tin and thallium and mixtures of one of said metals with manganese in proportions, by weight of the composition, of about 0.1% copper, 1–3% antimony, 2–10% tin, 1% thallium and 1–5% manganese.

2. A luminescent composition having a matrix of apatite type crystalline structure of the group consisting of $3M_3(PO_4)_2 \cdot M(OH)_2$ and $$3M_3(PO_4)_2 \cdot MO$$

wherein M is an alkaline earth metal, and about 0.1% by weight of the composition of a copper activator.

3. The method of manufacturing a luminescent material which comprises the step of heating to a temperature in the range of about 900–1200° C., in an atmosphere comprising steam, a mixture of an activator of the group consisting of one of the metals copper, antimony, tin and thallium and mixtures of one of said metals with manganese in proportions by weight of the composition of about 0.1% copper, 1–3% antimony, 2–10% tin, 1% thallium and 1–5% manganese, together with material selected from the group consisting of an alkaline earth halophosphate compound having the apatite type of crystal structure and starting materials consisting only of a salt of an alkaline earth metal and a phosphate compound other than a halophosphate, in proportions to produce, during the heating, a compound of the group consisting of alkaline earth hydroxy-phosphates and oxy-phosphates having the apatite type of crystal structure and corresponding to the formulae $$3M_3(PO_4)_2 \cdot M(OH)_2$$

and $3M_3(PO_4)_2 \cdot MO$ wherein M is an alkaline earth metal, and continuing the heating until said material has chemically reacted with the steam to form an apatite type luminescent composition of the group consisting of alkaline earth hydroxy-phosphates and oxy-phosphates.

4. The method of preparing a novel luminescent composition which comprises mixing a salt of an alkaline earth metal and a phosphate compound other than a halophosphate, which would react, upon heating, to yield an alkaline earth phosphate of apatite proportions corresponding to $3M_3(PO_4)_2 \cdot MO$ wherein M is the alkaline earth metal, adding thereto a compound of activating metal of the group consisting of copper, antimony, tin, thallium and mixtures of a compound of one of said activating metals with a compound of manganese in proportions to furnish the activating metals in amounts, by weight of the final composition, of approximately 0.1% copper, 1–3% antimony, 2–10% tin, 1% thallium and 1–5% manganese, and firing the mixture in an atmosphere of steam at a temperature in the range of about 900–1200° C. for a time sufficient to form an activated apatite crystalline luminescent substance of the group consisting of alkaline earth hydroxy-phosphates and oxy-phosphates.

5. The method of preparing a luminescent composition which comprises intimately mixing together, by weight, about 10 parts of calcium carbonate, 7.9 parts of diammonium hydrogen phosphate and an activating compound of the group consisting of 0.04 part copper sulphate, 0.4 part antimony trioxide, 1 part stannous oxide, 0.2 part thallous nitrate and a mixture of 0.2 part thallous nitrate with 0.3 part manganese phosphate, heating the mixture in air at about 1000° C. for about half an hour, grinding the resulting product, and then heating in an atmosphere of steam at a temperature of about 1150° C. for about half an hour.

6. The method of preparing a novel luminescent composition which comprises heating in an atmosphere of steam at about 1150° C. for about half an hour a fluorescing calcium fluorophosphate, $3Ca_3(PO_4)_2 \cdot 1CaF_2$ activated with metal of the group consisting of antimony and mixtures of antimony with manganese.

7. The method of preparing a luminescent composition which comprises intimately mixing together, by weight, about 10 parts of strontium carbonate, 5.4 parts of diammonium hydrogen phosphate, 0.35 part stannous oxide and 0.1 part manganese phosphate, heating the mixture in air at about 1100° C. for about half an hour, grinding the resulting product, and heating in an atmosphere of steam at about 1150° C. for about 15 minutes.

ALFRED HAMILTON McKEAG.
PETER WHITTEN RANBY.

(References on following page)

References Cited in the file of this patent

UNITED STATES PATENTS

| Number | Name | Date |
|---|---|---|
| 2,306,567 | Roberts | Dec. 29, 1942 |
| 2,415,129 | Froelich | Feb. 4, 1947 |
| 2,435,436 | Fonda | Feb. 3, 1948 |
| 2,525,028 | Froelich | Oct. 10, 1950 |

FOREIGN PATENTS

| Number | Country | Date |
|---|---|---|
| 577,693 | Great Britain | May 28, 1946 |
| 578,192 | Great Britain | June 19, 1946 |
| 578,272 | Great Britain | June 21, 1946 |

OTHER REFERENCES

Mellor: Inorganic and Theoretical Chemistry, 1923, vol. III, p. 896.

Imore: Sc. Pap. Inst. Phys. Chem. Res., Tokio 27 (1935), pp. 1-8.